(12) United States Patent
Stanesic

(10) Patent No.: US 6,406,085 B1
(45) Date of Patent: Jun. 18, 2002

(54) REMOVABLE BI-SECTION CARGO COVER SYSTEM

(75) Inventor: J. Matthew Stanesic, West Chester, OH (US)

(73) Assignee: Nifty Products, Inc., Hamilton, OH (US)

( * ) Notice: Subject to any disclaimer, the term of this patent is extended or adjusted under 35 U.S.C. 154(b) by 0 days.

(21) Appl. No.: 09/758,118

(22) Filed: Jan. 12, 2001

(51) Int. Cl.[7] .............................................. B62D 25/20
(52) U.S. Cl. ..................... 296/97.23; 296/39.1; 296/66; 296/1
(58) Field of Search ............................... 296/97.23, 69, 296/37.8, 37.16, 39.1, 66, 1

(56) References Cited

U.S. PATENT DOCUMENTS

| | | | |
|---|---|---|---|
| 3,317,238 A | | 5/1967 | Smoll |
| 3,807,790 A | * | 4/1974 | Erard ........................... 296/66 |
| 4,399,176 A | * | 8/1983 | Bell et al. ...................... 296/1 |
| 4,673,603 A | * | 6/1987 | Roth ............................. 296/1 |
| 4,829,627 A | * | 5/1989 | Altus et al. ............. 296/97.23 |
| 4,848,826 A | * | 7/1989 | Kuwabara et al. ........ 296/97.23 |
| 4,932,709 A | * | 6/1990 | Wainwright ................. 296/66 |
| 4,943,105 A | * | 7/1990 | Kacer et al. .............. 296/39.1 |
| 4,968,548 A | | 11/1990 | Gibson et al. |
| 4,979,772 A | * | 12/1990 | Carey et al. ................. 296/66 |
| 4,984,838 A | * | 1/1991 | Kim ........................ 296/97.23 |
| 5,215,345 A | * | 6/1993 | Orphan ...................... 296/39.1 |
| 5,322,335 A | * | 6/1994 | Niemi ..................... 296/97.23 |
| 5,358,768 A | * | 10/1994 | Wiley, III ................ 296/97.23 |
| 5,570,921 A | * | 11/1996 | Brooker ..................... 296/39.1 |
| 5,683,132 A | | 11/1997 | Danzo et al. |
| 5,806,909 A | | 9/1998 | Wise |
| 5,830,560 A | * | 11/1998 | Koa ........................ 296/97.23 |
| 5,891,546 A | | 4/1999 | Sherman |
| 5,944,371 A | | 8/1999 | Steiner et al. |
| 5,979,964 A | * | 11/1999 | Ban et al. ..................... 296/66 |
| 6,017,074 A | * | 1/2000 | Biskup ....................... 296/39.1 |
| 6,027,782 A | * | 2/2000 | Sherman .................. 296/97.23 |
| 6,102,464 A | | 8/2000 | Schneider et al. |
| 6,129,404 A | * | 10/2000 | Mattarella et al. ....... 296/65.09 |

\* cited by examiner

Primary Examiner—Ken Patel
(74) Attorney, Agent, or Firm—Charles R. Wilson

(57) ABSTRACT

A removable bi-section cargo cover system comprises a molded floor mat and at least two detachable straps. The bi-section cargo cover system is used in a vehicle where the cargo area is convertible from a full sized to a reduced sized cargo area. The molded floor mat component includes a fold line extending from one side edge to an opposed side edge which creates two sections. The detachable straps hold the molded floor mat to the auxiliary seat backs. When the auxiliary seats are folded-down in a subfloor of the cargo area, the molded floor mat is in a planar mode overlying substantially the full sized cargo area floor surface. When the auxiliary seats are folded-up, the mold floor mat is in a right angle mode overlying substantially the reduced sized cargo area floor surface and the seat backs.

15 Claims, 5 Drawing Sheets

REMOVABLE BI-SECTION CARGO COVER SYSTEM

This invention relates to a removable cargo cover system intended for use in a vehicle. More particularly, the invention relates to a removable bi-section cargo cover system capable of folding to accommodate both a full sized cargo area and a reduced sized cargo area of the vehicle.

Sport utility vehicles commonly known as SUV's are a popular selling vehicle. They typically have a cargo area in the rear of the vehicle which is most conveniently accessed from a rear door. The cargo area is in lieu of a trunk found on the more conventional auto. The rear door is hinged so that it swings upwardly to fully expose the cargo area. This area is most often carpeted, similar to the carpeted areas found in the front of the SUV. A removable one piece molded floor mat is often placed over the carpet in the cargo area to protect it.

Newer model SUV's are being produced which offer a set of auxiliary fold-down seats installed behind a conventional back seat, whether a back bench seat or individual back seats. The auxiliary seats can be folded down into the floor to present a substantially flat surface or can be folded-up to an erect state suitable for seating. In effect, a third row of seats can be created if needed. Inclusion of the auxiliary fold-down seats in the vehicle gives the vehicle's owner an option of a full cargo area to store or haul items or extra seating capacity.

In the past, attempts have been made to produce a floor mat which can cover both a normal cargo area and an enlarged cargo area such as obtained when back seats directly behind the driver's seat and front passenger seat are folded down. A generally flattened area is presented by the folded-down back seat and the balance of the cargo area surface. Ideally, the back of the back seat when in this fold-down position should be covered to protect it. Attempts have been made to create a floor mat which is able to cover both the normal cargo area and the enlarged cargo area. Examples are found in U.S. Pat. Nos. 3,317,238, 4,848,826, 4,968,548, 4,979,772, 5,215,345, 5,322,335, 5,683,132, 5,806,909, 5,944,371, 6,102,464. However, the known products appear to be either flimsy coverings not capable of fully protecting the carpet in the cargo area, bulky articles cumbersome to use, or expensive articles given the intended use.

In accord with a need, there has been developed a floor covering sized to fit into a cargo area of a SUV and capable of substantially covering a floor surface in the cargo area whether in a normal full sized configuration or in a reduced sized configuration. The floor covering can be removed and periodically cleaned. It is manufactured at a reasonable cost, is readily installed in the vehicle, and is effective in performing its dual functions.

SUMMARY OF THE INVENTION

A removable bi-section cargo cover system is configured for positioning in a back cargo area of a vehicle. The system comprises a molded floor mat and at least two detachable attaching means. The molded floor mat includes a fold line extending from one side edge to an opposed side edge. The fold line divides the floor mat into a first section and a second section. Each of the at least two detachable attaching means is for attachment at one terminus to the molded floor mat and at another terminus to the auxiliary seat. The molded floor mat is capable of folding about its fold line to substantially cover the full cargo area or to substantially cover a reduced cargo area as is created when the auxiliary seats are moved to a fold-up position in the normal cargo area.

DETAILED DESCRIPTION OF THE INVENTION

The removable bi-section cargo cover system of the invention is designed for use in the cargo area of a SUV. It finds its most use in the SUV and is for this reason described with particularity in the following paragraphs and with reference to the drawings. The removable bi-section cargo cover system is also useful in other vehicles where a cargo area is convertible from a full sized cargo area to a reduced sized cargo area.

Figure 1:
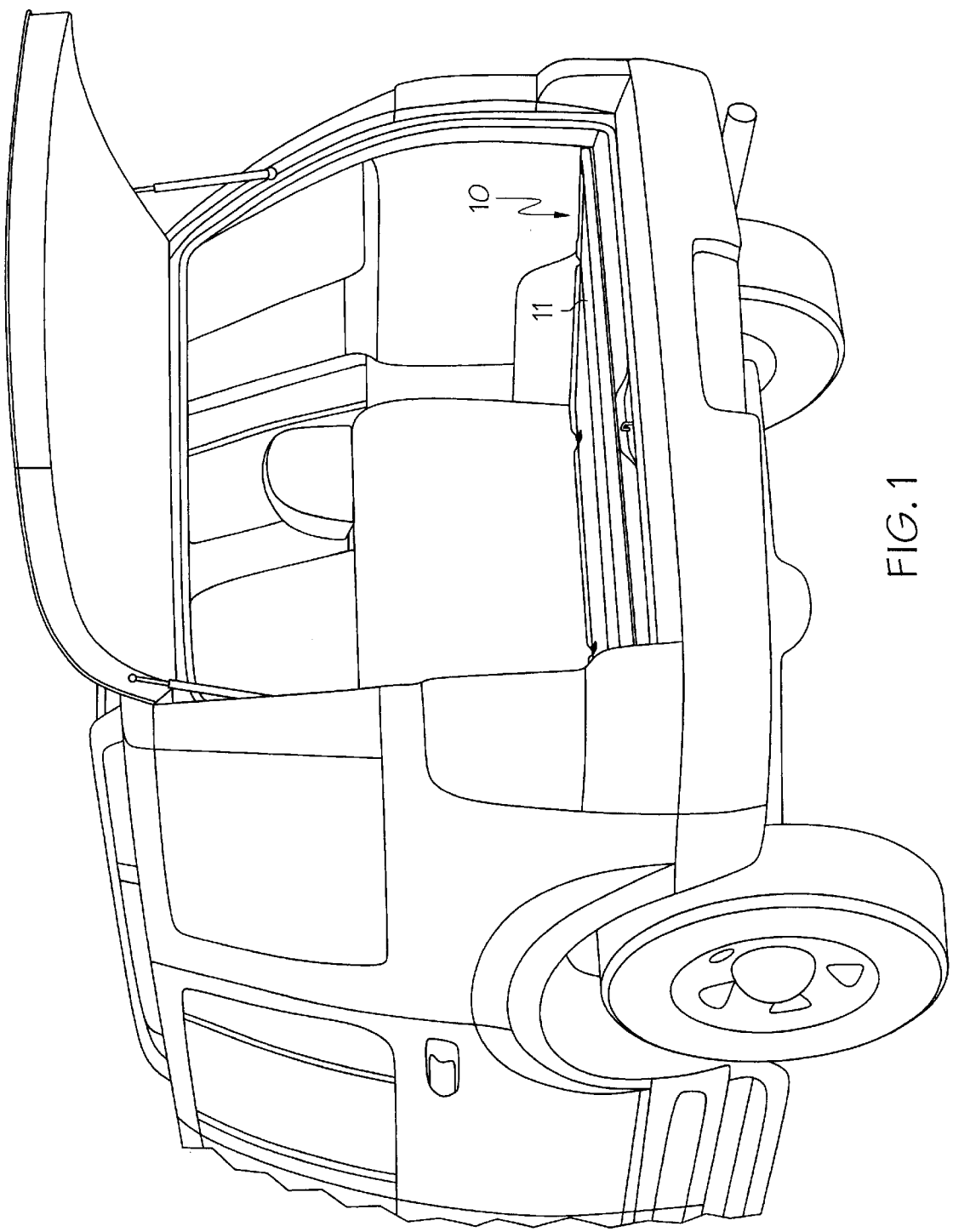
FIG. 1 is a view in perspective of the removable bi-section cargo cover system positioned in the cargo area of a vehicle when a set of auxiliary seats are in a fold-down position.
Figure 2:
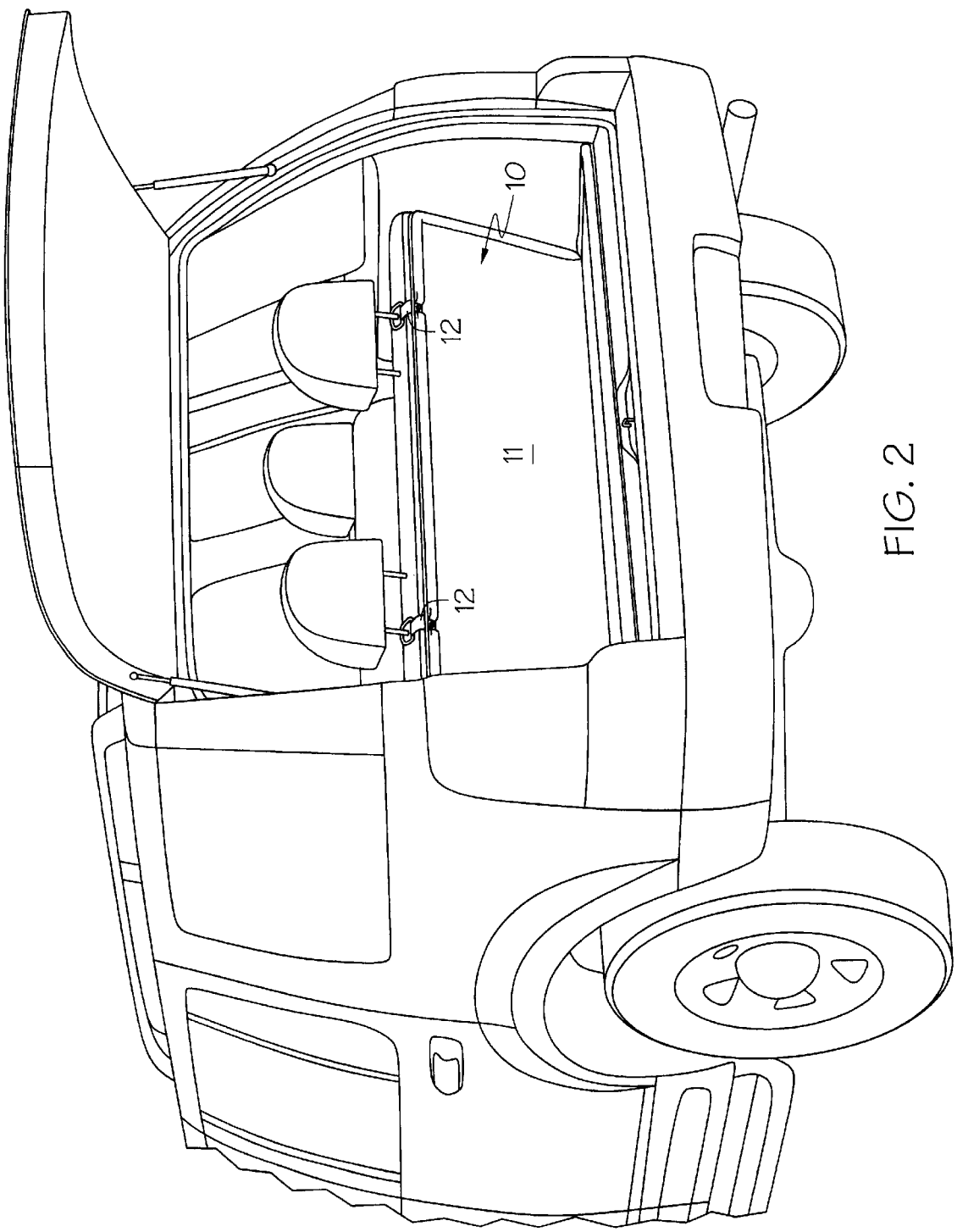
FIG. 2 is a view in perspective of the removable bi-section cargo cover system of FIG. 1 when the auxiliary seats are in a fold-up position.

The removable bi-section cargo cover system is intended to fit into the cargo area and snugly fit within its confines. A molded floor mat component of the system is able to contain debris and serves to protect a carpeted floor surface. The molded floor mat is designed for periodic removable for cleaning purposes. With reference to FIGS. 1 and 2, the removable bi-section cargo cover system 10 comprises a molded floor mat 11 and at least two detachable attaching means 12. The molded floor mat depicted in the figures is highly preferred because of its tray-like center area and raised walls while the detachable attaching means also depicted in the figures are highly preferred for their ease of use features. The molded floor mat 11 and the detachable attaching means 12 are described in detail below as is their interaction.

As evident from the drawings, the bi-section cargo cover system 10 has a planar mode when auxiliary seats are in a fold-down position as in FIG. 1 and a right angle mode when the auxiliary seats are in a fold-up position as in FIG. 2. In each mode, the molded floor mat 11 remains attached to the auxiliary seats through the detachable attaching means 12.

Figure 3:
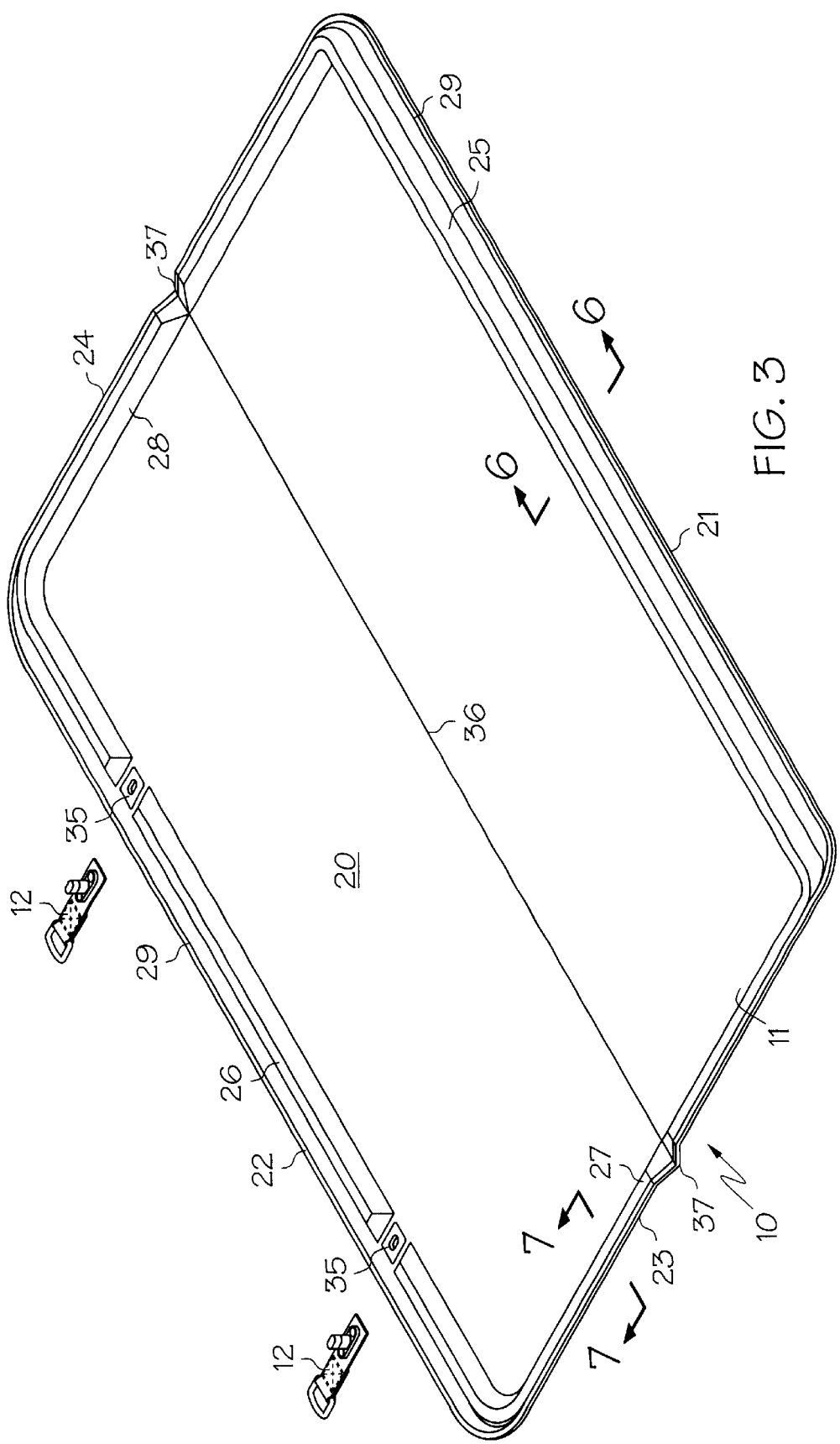
FIG. 3 is a view in perspective of the removable bi-section cargo cover system of FIG. 1 in isolation.
Figure 6:
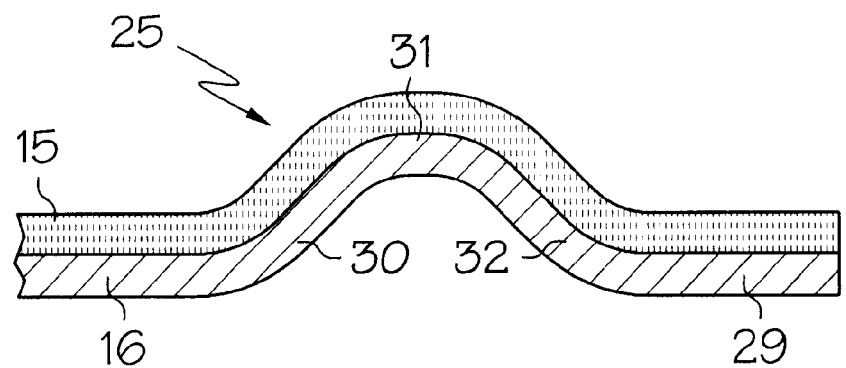
FIG. 6 is a view in section taken along line 6—6 of FIG. 3 showing a double walled raised wall found on a molded floor mat of the removable bi-section cargo cover system of FIG. 3.
Figure 7:
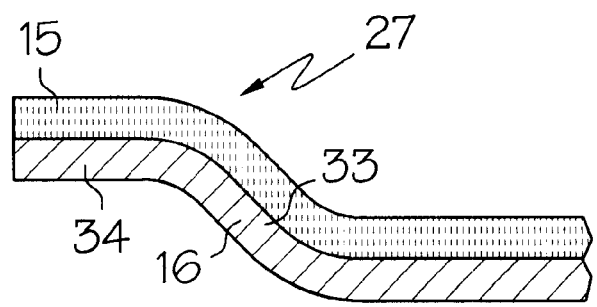
FIG. 7 is a view in section taken along line 7—7 of FIG. 3 showing a single walled raised wall of the molded floor mat of the removable bi-section cargo cover system of FIG. 3.

As best seen in FIGS. 3, 6 and 7, the molded floor mat 11 is a composite of one piece construction. That is, it is unitary in structure, there being no seams, overlapping edges or anything of this sort. The floor mat has two distinct layers as evident in FIGS. 6 and 7. A tufted carpet 15 represents the top layer. The carpet 15 includes a backing and pile yarn which are secured to the backing and form a pile surface on the carpet's top surface. The backing is a woven or non-woven fibrous material. The pile yarn can be made from a natural or synthetic materials. Typically, they are made from a synthetic material because such materials are more durable and clean better. Polyester, polypropylene, and nylon are examples of widely used pile yarn materials. The yarns are usually secured to the backing by a binder composition.

A thermoplastic backing material 16 represents the second layer and covers the underside of the carpet 15. The thermoplastic backing material 16 provides toughness and elasticity. Primarily, it imparts stiffness and moldability to the carpet so that the carpet can be molded to a desired deeply contoured shape and such shape be retained. Examples of suitable thermoplastics include polymers of ethylene and propylene, copolymers of ethylene with ethylenically unsaturated monomers, e.g. ethylenevinyl acetate, acrylates, polyvinyl chlorides and styrene-butadiene polymers. Preferably, the thermoplastic backing material is capable of being softened at a temperature of from about 300 degrees F to about 500degrees F to become readily moldable. It is applied to the tufted carpet in any manner, e.g. by dispersion coating, extrusion coating, calendaring and lamination. Thermoplastic backed carpets of the nature described are commercially available in a range of colors and weights.

The floor mat 11 is molded to have a substantially flat base 20 with a front peripheral edge 21, back peripheral edge 22, and opposed side peripheral edges 23 and 24. In the highly preferred depicted embodiment of the invention, the molded floor mat 11 also has peripheral raised walls near its edges to create a tray-like center area. In the planar mode, the molded floor mat 11 has a front peripheral raised wall 25, a back peripheral raised wall 26, a first side peripheral raised wall 27 and a second side peripheral raised wall 28, all at substantially right angles to one another to form the tray-like center area.

The peripheral raised wall 25 adjacent a back door sill and the opposed peripheral raised wall 26 have the same configuration. Each is preferably doubled walled and each has a substantially horizontally extending floor engaging peripheral lip 29. With reference to FIG. 6, the double walled peripheral raised wall 25 has a vertically extending inside wall 30 which extends up from the flat base to about three inches, preferably about one inch to about two inches, a horizontally extending top wall 31, and a vertically extending outside wall 32 which extends down to the approximate same plane as the flat base 20. The floor engaging peripheral lip 29 extends substantially horizontally from the 5 outside wall 32. The peripheral lip lies in substantially the same plane as the flat base 20 of the floor mat. With reference to FIG. 7, the side peripheral raised wall 27 is single walled, with a substantially vertically extending single wall 33 and peripheral lip 34 which extends substantially horizontally to structurally 10 blend into a side wall of the vehicle's cargo area.

The tray-like center area of the molded floor mat helps to hold spilled liquids and debris within its confines. This further protects against staining or soiling of any vehicle carpet underlying the molded floor mat. It also facilitates cleaning of the carpet surface of the molded floor mat. Still useful, though, are molded car mats that are substantially flat from edge to edge without the tray-like center area.

The molded floor mat 11 must be specially configured for the vehicle where it is to be used. For example, edge areas on each lateral side may be curved inwardly to accommodate the vehicle's back wheel wells. The substantially flat center tray area may also have raised areas and suppressed areas to accommodate the vehicle's variously shaped floor surface area. As evident from FIG. 1, the molded floor mat is shaped to fit snugly into the interior vehicle 25 area with minimal uncovered peripheral open areas. As such, the relatively expensive original equipment carpet is fully protected.

Further and again with reference to FIG. 3, the molded floor mat 11 has a set of grommeted elongated holes 35 near the back edge 22 and in alignment with head rest posts. Each grommeted elongated hole is sized to operate with the detachable attaching means 12 as further discussed below. As shown, the raised wall 26 has three sections created by inclusion of the two grommeted holes 35. The holes 35 could as well be more near the peripheral lip thus allowing for the raised wall 26 to extend fully across the back edge.

Still with reference to FIG. 3, the molded floor mat has a fold line 36 molded into its thermoplastic backing. The fold line 36 is to facilitate the folding of the floor mat from its planar mode to its right angle mode. The fold line extends from one side edge 23 to an opposed side edge 24. It effectively forms a first section 15 defined by the front edge 21, side edge 23, fold line 36 and side edge 24 and a second section defined by the back edge 22, side edge 24, fold line 36 and side edge 23. Further, the molded floor mat 11 preferably has molded V-shaped indentations 37 at each terminus of the fold line 36 to facilitate folding of the mat at the fold line.

Figure 4:
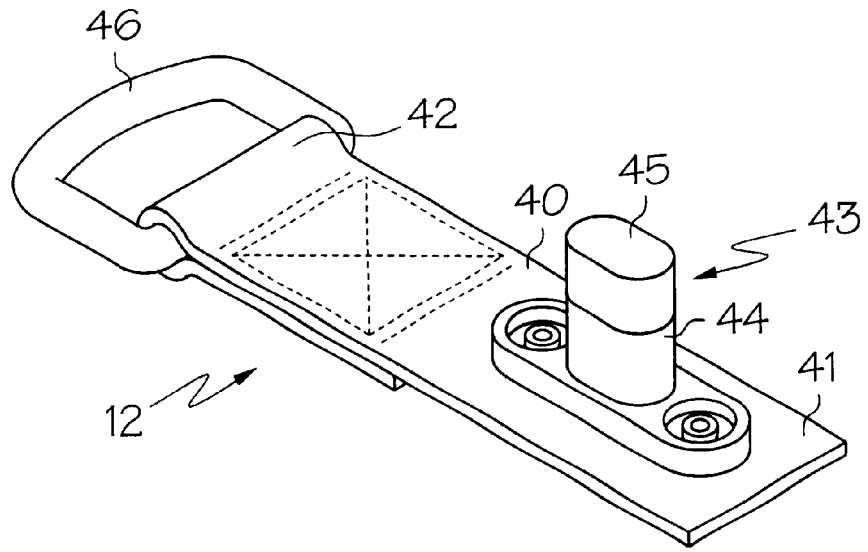
FIG. 4 is a view in perspective of a detachable attaching means found on the removable bi-section cargo cover system of FIG. 3.
Figure 5:
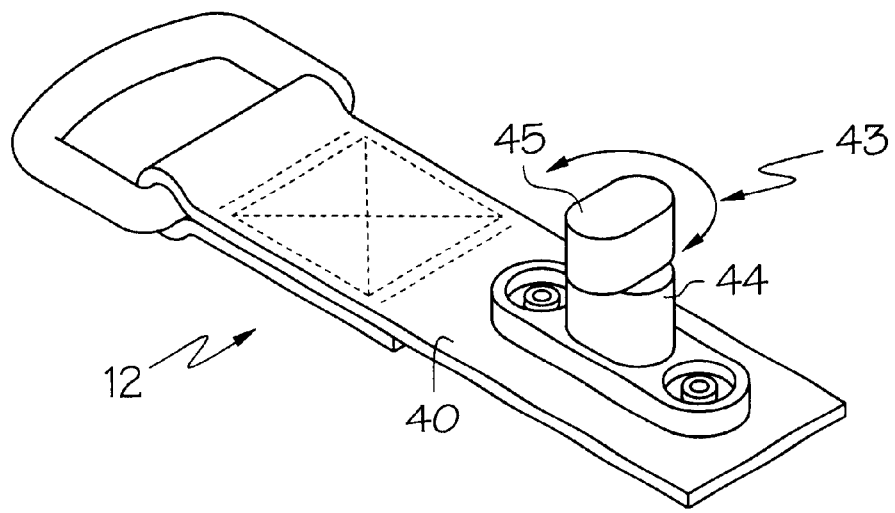
FIG. 5 is a view in perspective of the detachable attaching means of FIG. 4 showing rotation of an elongated hold arm.

The detachable attaching means 12 are best seen in FIGS. 4 and 5. Each of the attaching means 12 has a strap 40 which is flexible with a first terminus 41 and a second terminus 42. The first terminus 41 has a latching member 43 dimensioned to fit through the grommeted hole 35 in the molded floor mat 11. The latching member 43 is permanently secured to the strap 40. It includes a post 44 and an elongated hold arm 45 rotatably mounted on the post. The length of the post 44 is sufficiently long to fit through the hole 35 of the floor mat 11. The elongated hold arm 45 has a length which allows it to pass through the hole in the molded floor mat when properly aligned. When rotated about 90 degrees about the post, the elongated hold arm overlies edges of the grommeted elongated hole 35 and effectively traps the molded floor mat 11. Such latching members are commercially available. As should be apparent, their manner of operating makes them particularly useful in that they allow for a quick detachment of the molded floor mat 11 from the attaching means 12. The molded floor mat can thus be readily removed for periodic cleaning and readily reinstalled.

The second terminus of the strap 40 has a D-shaped buckle 46. The buckle 46 is dimensioned to fit onto the head rest post. Other structures which interact with the head rest post can be used in place of the buckle 46. For example, a circular ring can be secured to the second terminus of the strap. A grommeted hole in the strap 40 near the second terminus 42 can as well be used. An open ended ring could be used when legs of the ring are resilient enough to spread open during installation on the head rest posts.

It should be apparent that each of the attaching means 12 is readily positioned on the molded floor mat by use of the latching members 43. The attaching means is also readily positioned on the head rest post simply by removing the head rest with its post attached, positioning the buckle 46 onto the head rest post and finally repositioning the head rest onto the auxiliary seat.

Other detachable attaching means can be used. For example, straps which have a hook or loop fastener commonly sold as Velcro on one or both terminuses can be used. Still other attaching means which secure the molded floor mat to the auxiliary seats can be used.

Optional features can be added to the removable bi-section cargo cover system of the invention. For example, the peripheral edges can all be finished by serging or a stitched binding.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A removable bi-section cargo cover system for positioning in a cargo area of a vehicle wherein the cargo area defined in part by auxiliary seats is convertible from having a full sized cargo area to a reduced sized cargo area, said removable bi-section cargo cover system comprising:

(a) a molded floor mat configured to snugly fit into the full sized cargo area of the vehicle to substantially cover the full sized cargo area floor surface, said molded floor mat having a front peripheral raised wall with a front peripheral edge, a back peripheral raised wall with a back peripheral edge and opposed side first and second peripheral raised walls with side peripheral edges to form a tray-like central area and further said molded floor mat having a fold line extending in a mid-section of said molded floor mat from one of said side peripheral edges to the opposed side peripheral edge with a V-shaped indentation in each terminus of the fold line at the side peripheral edges for facilitating folding the molded floor mat at the fold line to create a first section defined by the front peripheral edge, opposed side peripheral edges and fold line and a second section defined by the back peripheral edge, opposed side peripheral edges and fold line; and (b) at least two detachable attaching means operably associated with the molded floor mat for removably attaching to the molded floor mat and for semi-permanently attaching to the auxiliary seats, whereby the removable bi-section cargo cover system is attached to the auxiliary seats and is foldable about the fold line in the molded floor mat to convert from a planar mode overlying substantially the full sized cargo area to a right angle mode overlying substantially both the reduced sized cargo area and the backs of the auxiliary seats.

2. The removable bi-section cargo cover system of claim 1 wherein the front peripheral raised wall, first side peripheral raised wall, back peripheral raised wall, and second side peripheral raised wall of the molded floor mat are at about right angles to one another to form the tray-like central area.

3. The removable bisection cargo cover system of claim 2 wherein the front peripheral raised wall and the back peripheral raised wall are each double walled with an inside wall, a top wall and a outside wall and further a floor engaging lip extending from the outside wall which lies substantially in the same plane as the flat base.

4. The removable bi-section cargo cover system of claim 3 wherein each of the floor engaging lips of the raised walls has a finished edging.

5. The removable bi-section cargo cover system of claim 1 wherein the molded floor mat has a set of holes near the back peripheral edge to receive the detachable attaching means.

6. The removable bi-section cargo cover system of claim 5 wherein the molded floor mat has at least two spaced elongated holes near the back edge in alignment with head rest posts of at least two spaced head rests on the auxiliary seats.

7. The removable bi-section cargo cover system of claim 6 wherein each of the at least two detachable attaching means has a strap with one terminus having a latching member secured thereto, said latching member having a post extending substantially perpendicularly from the strap and an elongated hold arm rotatably attached to a free end of the post, said elongated hold arm for extending through one of the at least two elongated holes in the molded floor mat and rotating about 90 degrees to trap the molded floor mat to the attaching means.

8. The removable bi-section cargo cover system of claim 7 wherein each strap of the at least two detachable attaching means has a second terminus with a buckle for fitting onto one of the head rest posts secured to the auxiliary seats.

9. A removable bi-section cargo cover system for positioning in a cargo area of a vehicle wherein the cargo area is convertible from having a full sized cargo area to a reduced sized cargo area by causing at least two auxiliary seats normally stored in a sub-floor area of the cargo area to erect to form seats within the cargo area with each auxiliary seat having a seat portion and a back rest portion and further said back rest portion having at least one head rest post extending from a top surface with said head rest permanently mounted on the at least one head rest post, said removable bi-section cargo cover system comprising:

(a) a molded floor mat having a thermoplastic backing material and a carpet top surface configured when in a planar mode to snugly fit into the full sized cargo area of the vehicle to substantially cover the full sized cargo area floor surface, said molded floor mat having a flat base with a front peripheral raised double wall with a front peripheral edge, a back peripheral raised double wall with a back peripheral edge and opposed first and second side peripheral raised walls with side peripheral edges with each of said peripheral raised walls being at about right angles to one another to form a tray-like central area and further having a fold line molded into the floor mat's thermoplastic backing for folding to a right angle mode, said fold line extending in a mid-section of said molded floor mat from one of said side peripheral edges to the opposed side peripheral edge to create a first section defined by the front peripheral edge, opposed side peripheral edges and fold line and a second section defined by the back peripheral edge, opposed side peripheral edges and fold line; and (b) at least two detachable attaching means operably associated with the molded floor mat, each said at least two detachable attaching means having a first terminus with means for removably attaching to the molded floor mat and a second terminus with means for semi-permanently attaching to a head rest post, whereby the removable bi-section cargo cover system is attached to the at least two head rest posts of the auxiliary seats and is foldable about the fold line in the molded floor mat to convert from the planar mode overlying substantially the full sized cargo area floor surface to the right angle mode overlying substantially the reduced sized cargo area floor surface and the backs of the auxiliary seats.

10. The removable bi-section cargo cover system of claim 9 wherein the molded floor mat has a V-shaped indentation on each side edge extending to the fold line to facilitate folding said molded floor mat at the fold line.

11. The removable bi-section cargo cover system of claim 9 wherein the front peripheral raised double wall and the back peripheral raised double wall each have an inside wall, a top wall and an outside wall and further have a floor engaging lip extending from the outside wall which lies substantially in the same plane as the flat base.

12. The removable bi-section cargo cover system of claim 9 wherein the molded floor mat has a set of grommeted holes near the back peripheral edge to receive the detachable attaching means.

13. The removable bi-section cargo cover system of claim 12 wherein each of the at least two detachable attaching means has a strap with one terminus having a latching member secured thereto, said latching member having a post extending substantially perpendicularly from the strap and an elongated hold arm rotatably attached to a free end of the post, said elongated hold arm for extending through the grommeted hole in the molded floor mat and rotating about 90 degrees to trap the molded floor mat to the attaching means.

14. The removable bi-section cargo cover system of claim 13 wherein each strap of the at least two detachable attaching means has a second terminus with a buckle for fitting onto the head rest post secured to the auxiliary seat.

15. A removable bi-section cargo cover system for positioning in a cargo area of a vehicle wherein the cargo area is convertible from having a full sized cargo area to a reduced sized cargo area by causing auxiliary seats normally stored in a sub-floor area of the cargo area to erect to form seats within the cargo area with each auxiliary seat having a seat portion and a back rest portion and further said back rest portion having at least one head rest post extending from a top surface with said head rest permanently mounted on the at least one head rest post, said removable bi-section cargo cover system comprising:

(a) a molded floor mat having a thermoplastic backing material and a carpet top surface configured to snugly fit into the full sized cargo area of the vehicle to substantially cover the full sized cargo area floor surface, said molded floor mat having a flat base and a front edge with a front peripheral raised wall, a back edge with a back peripheral raised wall and opposed side edges with side peripheral raised walls and further wherein the front peripheral raised wall and the back peripheral raised wall are each double walled with an inside wall, a top wall and a outside wall and further each has a floor engaging lip extending from the outside wall which lies substantially in the same plane as the flat base, said molded floor mat further having a set of holes near the back edge and a fold line molded into the floor mat's thermoplastic backing material to extend in a mid-section of said molded floor mat from one of said side edges to the opposed side edge to create a first section defined by the front edge, opposed side edges and fold line and a second section defined by the back edge, opposed side edges and fold line; and (b) two detachable attaching means operably associated with the molded floor mat, each of said two detachable attaching means having a strap with a first terminus and a second terminus with a latching member secured to the first terminus of the strap, said latching member having a post extending substantially perpendicularly from the strap and an elongated hold arm rotatably attached to a free end of the post, said elongated hold arm for extending through one of the holes in the molded floor mat and rotating about 90 degrees for removably attaching to the molded floor mat and further with a buckle secured to the second terminus of the strap for semi-permanently attaching to a head rest post, whereby the removable bi-section cargo cover system is attached to the two head rest posts of the auxiliary seats and is foldable about the fold line in the molded floor mat to convert from a planar mode overlying substantially the full sized cargo area floor surface to a right angle mode overlying substantially the reduced sized floor surface area and the backs of the auxiliary seats.

* * * * *